(12) United States Patent
Dresselhaus et al.

(10) Patent No.: US 11,109,215 B2
(45) Date of Patent: Aug. 31, 2021

(54) CONTROLLING MESSAGE TRANSMISSION BETWEEN COMMUNICATION SUBSCRIBERS IN AN AUTOMATION SYSTEM

(71) Applicant: BECKHOFF AUTOMATION GMBH, Verl (DE)

(72) Inventors: Pascal Dresselhaus, Verl (DE); Dirk Janssen, Verl (DE); Sven Goldstein, Buende (DE); Timo Bracke, Verl (DE); Manuel Auster, Hövelhof (DE); Simon Geldner, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 52 days.

(21) Appl. No.: 16/409,936

(22) Filed: May 13, 2019

(65) Prior Publication Data
US 2019/0268429 A1    Aug. 29, 2019

Related U.S. Application Data

(63) Continuation of application No. PCT/EP2017/079601, filed on Nov. 17, 2017.

(30) Foreign Application Priority Data

Nov. 21, 2016 (DE) ..................... 10 2016 122 384.0

(51) Int. Cl.
*H04W 8/00* (2009.01)
*H04L 29/08* (2006.01)
(Continued)

(52) U.S. Cl.
CPC ............ *H04W 8/005* (2013.01); *G06F 9/542* (2013.01); *H04L 12/2809* (2013.01);
(Continued)

(58) Field of Classification Search
CPC .. H04W 8/005; H04W 48/16; H04L 41/0663; G06F 9/542
See application file for complete search history.

(56) References Cited

U.S. PATENT DOCUMENTS 6,952,731 B2    10/2005    Picca et al.
7,151,966 B1    12/2006    Baier et al.
(Continued)

FOREIGN PATENT DOCUMENTS

DE    112010005499 T2    3/2013
DE    112011103288 T5    7/2013
(Continued)

OTHER PUBLICATIONS

Christian Götz: "MQTT: Protokoll für das Internet der Dinge | Heise Developer", Heise Developer Apr. 15, 2014, p. 1-5, XP055440964; URL: https://www.heise.de/developer/artikel/MQTT-Protokoll-fuer-das-Internet-der-Dinge-2168152.html?seite=all.
(Continued)

*Primary Examiner* — Kyung H Shin
(74) *Attorney, Agent, or Firm* — Dorsey & Whitney LLP

(57) ABSTRACT

A message transmission between communication subscribers in an automation system is controlled, wherein publisher applications and/or subscriber applications are executed on each of the communication subscribers, wherein the automation system comprises a message broker configured to enter subscriptions for specified topics for designated subscriber applications into a topic tree. In reaction to a message on a specified topic of the topic tree being published by a publisher application of a first of the plurality of communication subscribers on the first communication subscriber offering one or a plurality of services, the message broker determines whether a subscriber application of a second of the plurality of communication subscribers has been entered for the specified topic. If a subscriber application for the
(Continued)

specified topic has been entered, the message broker transmits a message to the entered subscriber application of the second communication subscriber that one or the plurality of services are on offer.

20 Claims, 13 Drawing Sheets

(51) Int. Cl.
| | | |
|---|---|---|
| *H04L 12/28* | (2006.01) | |
| *H04L 12/58* | (2006.01) | |
| *G06F 9/54* | (2006.01) | |
| *H04W 48/16* | (2009.01) | |
| *H04L 12/24* | (2006.01) | |

(52) U.S. Cl.
CPC ............ *H04L 51/046* (2013.01); *H04L 67/12* (2013.01); *H04L 67/147* (2013.01); *H04L 67/26* (2013.01); *H04L 67/2809* (2013.01); *H04L 67/2833* (2013.01); *H04L 41/0663* (2013.01); *H04L 51/14* (2013.01); *H04W 48/16* (2013.01)

(56) References Cited

U.S. PATENT DOCUMENTS

| | | |
|---|---|---|
| 7,463,935 B1 | 12/2008 | Miller et al. |
| 7,706,895 B2 | 4/2010 | Callaghan |
| 7,853,677 B2 | 12/2010 | Callaghan |
| 8,402,101 B2 | 3/2013 | Callaghan |
| 8,489,782 B2 | 7/2013 | Chadbourne et al. |
| 9,122,651 B1 * | 9/2015 | Baulier ................. G06F 9/542 |
| 9,544,754 B1 * | 1/2017 | Lambert ............... H04W 8/005 |

FOREIGN PATENT DOCUMENTS

| | | |
|---|---|---|
| DE | 102015107478 A1 | 11/2016 |
| EP | 2291971 B1 | 2/2012 |
| EP | 2566281 A1 | 3/2013 |

OTHER PUBLICATIONS

Anonymous: "MQTT Version 3.1.1 Plus Errata 01", Dec. 10, 2015, p. 1081, XP055439486; URL: http://docs.basis-open.org/mqtt/mqtt/v3.1.1/mqtt-v3.1.1.pdf.

* cited by examiner

CONTROLLING MESSAGE TRANSMISSION BETWEEN COMMUNICATION SUBSCRIBERS IN AN AUTOMATION SYSTEM

CROSS-REFERENCE TO RELATED APPLICATIONS

This application is a continuation of PCT Application No. PCT/EP2017/079601 filed Nov. 17, 2017 which claims priority to German Patent Application DE 10 2016 122 384.0, filed Nov. 21, 2016, entitled KONZEPT ZUM STEUERN EINER NACHRICHTENÜBERMITTLUNG ZWISCHEN KOMMUNIKATIONSTEILNEHMERN EINES AUTOMATISIERUNGSSYSTEMS, each of which is incorporated by reference herein, in the entirety and for all purposes.

FIELD

The present invention relates to a method for controlling a message transmission between communication subscribers of an automation system. The invention further relates to a message broker for an automation system. The invention additionally relates to an automation system as well as to a computer program.

BACKGROUND

Automation systems generally comprise a plurality of communication subscribers. In this context, it may e.g. be provided that a communication subscriber offers one or a plurality of services for the other communication subscribers.

A requirement exists for notifying the other communication subscribers in an efficient manner that one communication subscriber offers a service or a plurality of services.

Publication DE 11 2010 005 499 T5 discloses a method for controlling message transmission between one or a plurality of publisher applications or one and a plurality of subscriber applications.

EP patent 2 566 281 B1 discloses an architecture of an Internet of Things.

SUMMARY

The present invention provides an improved concept for efficiently controlling a message transmission between communication subscribers of an automation system.

EXAMPLES

According to an aspect, a method for controlling message transmission between communication subscribers of an automation system is provided, wherein one or a plurality of publisher applications and/or one or a plurality of subscriber applications are carried out on each of the communication subscribers, wherein the automation system comprises a message broker configured to enter subscriptions for specified topics for designated subscriber applications into a topic tree, said method comprising the following steps:

in reaction to a message on a specified topic of the topic tree being published by a publisher application of a first of the plurality of communication subscribers on the first communication subscriber offering one or a plurality of services;

determining by the message broker whether a subscriber application of a second of the plurality of communication subscribers has been entered for the specified topic or not;

if a subscriber application for the specified topic has been entered, transmitting, by the message broker, a message to the entered subscriber application of the second communication subscriber that the one or the plurality of services are on offer.

According to a further aspect, a message broker for an automation system is provided, the message broker being configured to carry out the method for controlling a message transmission between communication subscribers in an automation system.

According to another aspect, an automation system is provided which comprises a plurality of communication subscribers and the message broker for an automation system.

According to a further aspect, a computer program is provided which comprises program code for executing the method for controlling message transmission between communication subscribers of an automation system if the computer program is executed on a computer, in particular on a message broker.

The concept is based on the recognition that the above object may be solved by a communications subscriber that offers a service or a plurality of services publishing these services for a specified topic ("published"). Subscriber applications of further communication subscribers that are entered for the corresponding topic are thus notified by the message broker that corresponding services are on offer. In this context, it is to be noted that the message broker merely submits a message to the entered subscriber applications informing that one or a plurality of service(s) are being offered. The message submitted by the message broker in particular does not comprise the information by which communication subscriber the service(s) is/are offered. Thus, the first communication subscriber remains anonymous.

Another particular advantage is that the communication subscribers of the automation system do not have to know each other. For example, the first communication subscriber publishes a message on a specific topic. The second communication subscriber has subscribed to the topic. Via the message broker, the second communication subscriber subsequently receives the message without knowing that the message originates from the first communication subscriber.

As a result, anonymity is established.

In the automation system, it is thus not provided, e.g., in particular not possible, to directly send a message from one communication subscriber to another communication subscriber. All subscriber applications of the communication subscribers that have been entered for a specific topic may generally access all messages for the specific topic. This also means that the communication subscribers do not know each other. The message broker decouples a message transfer and thus the data transfer between the communication subscribers.

All messages, and thus all data, are exclusively handled by the message broker.

This particularly has the technical advantage that communication subscribers of an automation system may efficiently be notified on one or a plurality of services being offered.

The concept is thus particularly based on the use of a principally known message-transmitting mechanism referred to as publish-subscribe-message-transmitting mechanism. By the publish-subscribe-message-transmitting mechanism, subscriber applications may receive information in the form of messages from publisher applications. In this respect, a message in the sense of the description is e.g. a unit of data for exchange between application programs.

A publisher application may in particular be referred to as a "publisher".

A subscriber application may in particular be referred to as a "subscriber".

The communication subscribers are notified via the message broker if one of the communication subscribers offers one or a plurality of service(s), wherein notification is made only on the fact that one or a plurality of service(s) are on offer, however, not on the additional information that the one or a plurality of service(s) is/are offered by that one of the communication subscribers. Advantageously, it is provided such that as soon as one of the subscriber applications of a communication subscriber is entered for the specified topic, it is automatically notified by the message broker that said service or services is/are offered. As a result, the communication subscriber does not have to obtain this information by itself.

The corresponding communication subscriber hence knows that one or a plurality of service(s) are offered which the communication subscriber may thus in particular make use of.

According to an embodiment of the method, it is provided that the message from the publisher application of the first communication subscriber comprises the information in which topic of the topic tree assignments for the one or the plurality of service(s) are to be published, the method further comprising the following steps:

Entering, by the message broker, a subscription generated by a subscriber application of the first communication subscriber for the topic in the topic tree in which assignments for the one or for the plurality of service(s) are to be published;

in reaction to a message on the topic of the topic tree in which assignments for the one or for the plurality of service(s) are to be published having been published by a publisher application of the second communication subscriber that an assignment corresponding to the one or to the plurality of service(s) is to be executed, transmitting the published message by the message broker that an assignment corresponding to the one or to the plurality of service(s) is to be executed to the entered subscriber application of the first communication subscriber.

This particularly has the technical advantage that the assignment of the second communication subscriber may be efficiently transmitted to the first communication subscriber. In this context, it is thus sufficient for the publisher application of the second communication subscriber to publish a message on the topic in which corresponding assignments corresponding to the service or services(s) are to be published, that the first communication subscriber automatically receives the corresponding assignment—this because the subscriber application of the first communication subscriber has been entered into the corresponding topic in the topic tree.

The topic in which assignments are to be published for the service or services is e.g. the same topic as the specified topic on which the first communication subscriber has published the message that it offers one or a plurality of service(s), or it is e.g. a different topic.

According to a further embodiment of the method, it is provided that the assignment indicates that messages from a specific topic of the topic tree are to be processed by the service or the services, the method further comprising the following steps:

in reaction to that by a subscriber application of the first communication subscriber a subscription was generated for the specific topic;

entering the subscriber application of the first communication subscriber for the specific topic by the message broker;

transmitting the messages on the specific topic to the subscriber application of the first communication subscriber by the message broker.

This for example has the technical advantage that the data from the specific topic may be efficiently processed by the service of the first communication subscriber in reaction to the assignment.

This means that the second communication subscriber may efficiently cause the first communication subscriber by the corresponding message transmitted by the message broker to process data from a specific topic of the topic tree.

According to a further embodiment of the method, it is provided that the assignment indicates that data processed by the service or services are to be published for a predetermined topic of the topic three, the method comprising the following steps: in reaction to that a message comprising the processed data on the specified topic was published by a publisher application of the first communication subscriber, transmitting the message comprising the processed data to a subscriber application of the second communication subscriber entered for the specified topic by the message broker.

This for example has the technical advantage that the processed data may be efficiently transmitted to the second communication subscriber. Hence, this particularly means that in this context the second communication subscriber instructs the first communication subscriber, by using the message broker, where it is to send, e.g., to publish, the processed data. A subscriber application of the second communication subscriber is entered for the specified topic so that the processed data are automatically transmitted to the subscriber application of the second communication subscriber by the message broker.

According to an embodiment of the method, it is provided that the message that the first communication subscriber offers one or a plurality of services comprises a command specification that indicates which comments the service(s) expect(s), and/or comprises a parameter description that indicates which parameters the service(s) expect, the method comprising the following step:

transmitting the command specification and/or the parameter description to the entered subscriber application of the second communication subscriber by the message broker.

This for example has the technical advantage that the further communication subscribers may efficiently by informed by using the message broker which commands or parameters, respectively, the service(s) expect(s).

A command or, respectively, a parameter description particularly provides a command or, respectively, a parameter syntax.

Due to the fact that the entered subscriber application of the second communication subscriber automatically receives the command or, respectively, the parameter specification on the basis of the entry, updates of command or, respectively, parameter specifications may efficiently be communicated to the second communication subscriber in an advantageous and efficient manner.

Thus, if e.g. a command syntax or, respectively, a parameter syntax should change, this change may efficiently be communicated to the second communication subscriber.

According to an embodiment, the method comprises the following step: in reaction to a message of a publisher application of one of the communication subscribers on a topic being published wherein the message comprises a data specification on how the data of one of the communication subscribers have to be interpreted, saving the data specification by the message broker.

This for example has the technical advantage that the communication subscribers may be efficiently informed on how to data provided by one of the communication subscribers have to be interpreted.

Hence, the data specification may e.g. be transmitted to the new subscriber application at a later point in time in reaction to receiving a later demand for a subscription relating to a new subscriber application for the topic.

By transmitting the data specification to correspondingly entered subscriber applications, in particular the technical advantage is furthermore achieved that an update or change of the data specification is automatically communicated to the entered subscriber applications, as well.

In an embodiment, the data specification is stored in a retain topic.

A retain topic is a topic in which messages remain stored, even if no subscriber application is currently entered for the topic.

According to an embodiment of the method, it is provided that the specific topic of the topic tree corresponds to the topic of the message, the method comprising the following step:
  transmitting the data specification to the subscriber application of the first communication subscriber by the message broker.

This e.g. has the technical advantage that the first communication subscriber is efficiently informed on how the data that is has to process according to the assignment are to be interpreted.

This particularly results in an efficient publishing of meta information (data specification).

According to an embodiment of the method, it is provided that the messages are in a binary format.

This e.g. has the technical advantage of enabling an efficient and fast transmission or, respectively, exchange of data.

According to an embodiment, it is provided that the service(s) is/are selected from the following group of services: archiving, data analysis, condition monitoring.

This e.g. has the technical advantage that the automation system efficiently allows for archiving or, respectively, data analysis.

The concept of condition monitoring is based on a regular or permanent detection of a machine state by measuring and analyzing physical entities, such as vibration, temperature, position/approximation.

According to an embodiment of the method, it is provided that the plurality of communication subscribers is selected from the following group of communication subscribers: actuator unit, particularly drive unit, sensor unit, control unit, machine-control unit, database server, data-saving server.

This e.g. has the technical advantage that the automation system may be of multiple use.

An actuator unit particularly comprises one or a plurality of engines or, respectively, drives.

Technical functionalities of the message broker or, respectively, of the automation system analogously result from the corresponding technical functionalities of the method, and vice versa.

The wording "respectively" particularly comprises the wording "and/or".

According to an embodiment, one or a plurality of communication subscribers is configured as an Internet-of-Things client. The wording "Internet of Things" may be abbreviated by "IoT".

According to an embodiment, an assignment in the sense of the description comprises a time information on how long the service(s) is/are to carry out the assignment.

For example, the assignment indicates that the data are to be archived for a specific duration of time. After that duration has expired, the archiving process is e.g. stopped.

Processing data according to the description particularly comprises analyzing or, respectively, archiving data. Archiving data particularly comprises storing data.

BRIEF DESCRIPTION OF THE DRAWINGS

The present invention will be explained in more detail in conjunction with the accompanying drawings.

DETAILED DESCRIPTION

Figure 1:
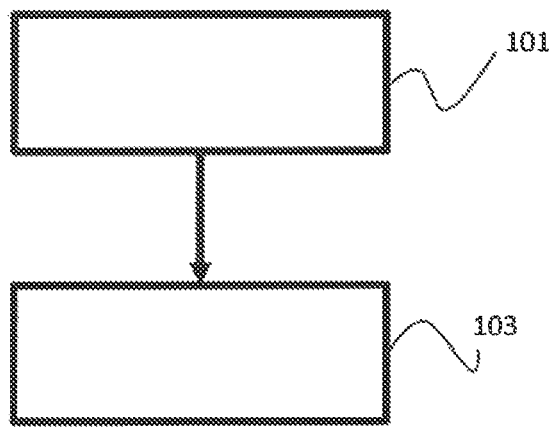
FIG. 1 shows a flow chart of a method for controlling a message transmission between communication subscribers of an automation system.

In the following, same reference numerals may be used for same features.

FIG. 1 shows a flow chart of a method for controlling a message transmission between communication subscribers of an automation system, wherein one or a plurality of publisher applications and/or one or a plurality of subscriber applications are executed on the communication subscribers, wherein the automation system comprises a message broker that is configured to enter subscriptions for specified topics for specified subscriber applications into a topic tree, comprising the following steps:
  in reaction to a message on a specified topic of the topic tree being published by a publisher application of a first of the plurality of communication subscribers on the first communication subscriber offering one or a plurality of services,
  determining 101 by the message broker whether a subscriber application of a second of the plurality of communication subscribers has been entered for the specified topic or not,
  if a subscriber application for the specified topic has been entered, transmitting 103, by the message broker, a message to the entered subscriber application of the second communication subscriber that the one or the plurality of services are on offer.

Figure 2:
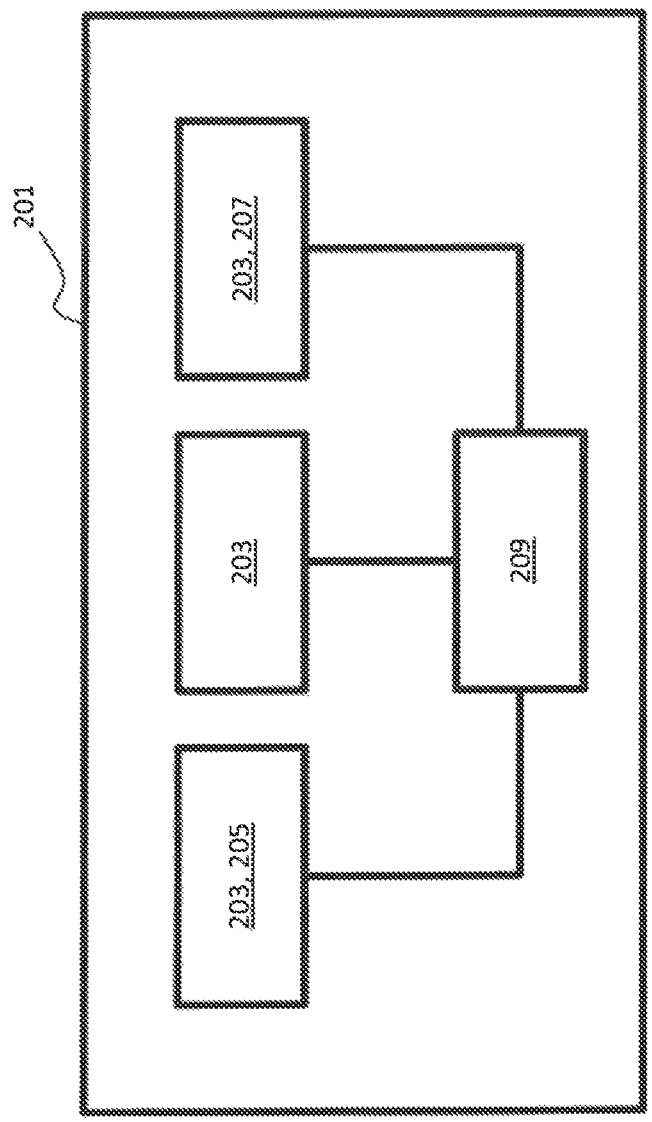
FIG. 2 depicts an automation system.
Figure 3:
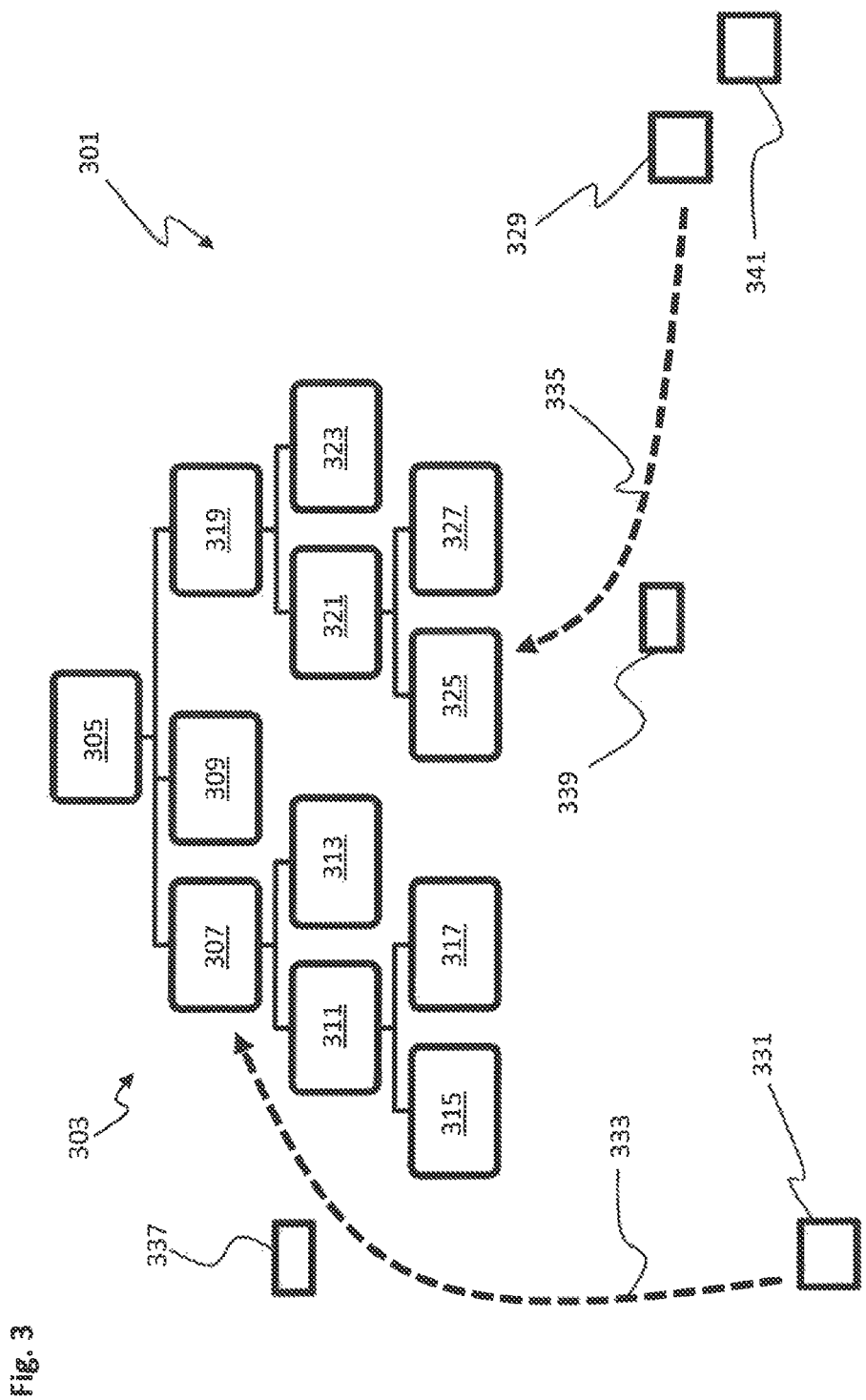
FIGS. 3 to 8 respectively show a block diagram illustrating various steps in a method for controlling a message transmission between communication subscribers of an automation system.
Figure 4:
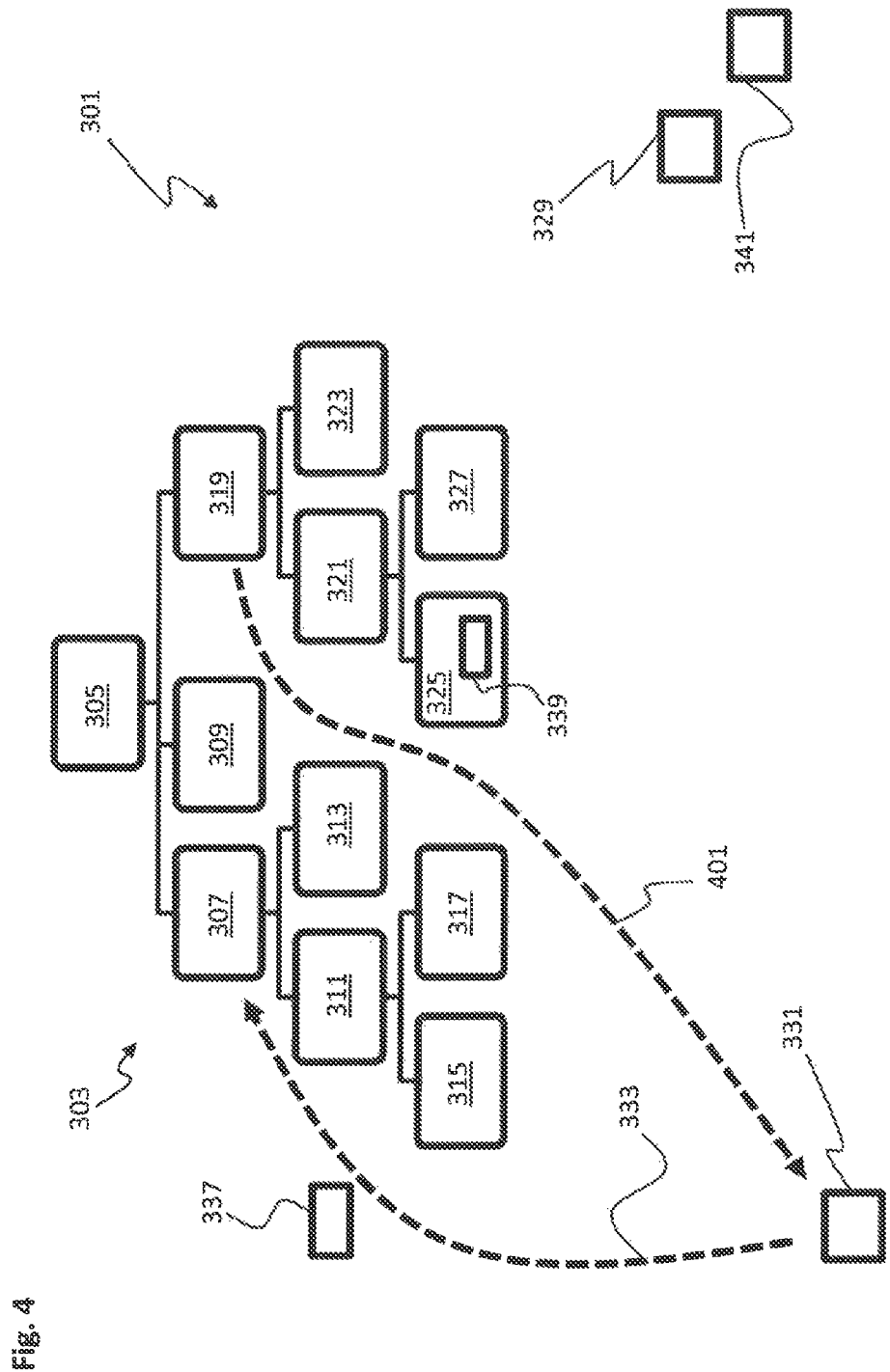

FIG. 2 depicts an automation system 201.

The automation system 201 comprises a plurality of communication subscribers 203 as well as a message broker 209.

One of the communication subscribers 203 will in the following be referred to as the first communication subscriber and is in addition indicated by reference numeral 205.

Another of the plurality of communication subscribers 203 will in the following be referred to as the second communication subscriber and is in addition indicated by reference numeral 207.

On the plurality of communication subscribers 203, one or a plurality of publisher applications and/or one or a plurality of subscriber applications are respectively executed. The message broker 209 is configured to enter subscriptions for specified topics for specified subscriber applications into a topic tree.

The message broker 209 is e.g. configured—in reaction to a message on a specified topic of the topic tree having been published by a publisher application of the first communication subscriber 205, indicating that the first communication subscriber 205 offers one or a plurality of services—to determine whether a subscriber application of the second communication subscriber 207 is entered for the specified topic or not.

The message broker 209 is e.g. configured—when a subscriber application is entered for the indicated topic—to transmit a message via the entered subscriber application of the second communication subscriber 207 that one or a plurality of service(s) is/are on offer.

The plurality of communication subscribers 203 are e.g. configured as IoT clients.

The first communication subscriber 205 is e.g. configured as a data-processing unit. The corresponding service is in this case e.g. a data analysis.

The second communication subscriber 207 is e.g. configured as a sensor unit. In this case, sensor data of the sensor unit 207 are transmitted to the data-processing unit 205 e.g. by using the message broker 209, so that said data-processing unit 205 may e.g. analyze, e.g., evaluate, the sensor data.

FIGS. 3 to 8 each show a block diagram of an automation system 301 which depicts steps in a method for controlling a message transmission between communication subscribers of an automation system.

The automation system 301 comprises a topic tree 303 that has a hierarchical structure. This means that the topic tree 303 comprises a number of topics 305 to 327 that are e.g. laid out as a tree structure that is e.g. partially or entirely hierarchical.

The individual topics particularly depend upon the actual automation system. In the following, examples for possible topics are listed that are used according to exemplary embodiments, wherein the listing is not to be considered in a limiting manner, but merely in an exemplary manner:

"Name of a manufacturer", "name of a client", "name of a machine", "transport system", "error message", "status report", "service name", "service description", "data description", "command description", "parameter description".

The manufacturer is e.g. a manufacturer for automation components such as a hardware or software manufacturer.

The manufacturer is e.g. the manufacturer of individual machines wherein the machines are e.g. made from a plurality of automation components.

The clients is e.g. the user of the manufacturer's products.

A machine is e.g. one of the following machines: machine tool, forging press, injection-molding machine, filling machine, industrial robot.

A transport system is e.g. a component of a machine of the manufacturer.

An actuator unit e.g. comprises one or a plurality of actuators. An actuator is e.g. one of the following actuators: relay, valve.

A sensor unit e.g. comprises one or a plurality of the following elements: temperature sensor, pressure sensor, light sensor, speed sensor.

A transport system e.g. comprises one or a plurality of drive units. A drive unit e.g. comprises one or a plurality of the following elements: stepper motor, linear motor, synchronous machine, asynchronous machine, frequency inverter, servo amplifier.

A transport system e.g. comprises an actuator unit and/or a sensor unit apart from at least one drive unit.

Messages in the sense of the present description e.g. comprise data. Data e.g. comprise error messages, e.g. an error message of a machine. Hence, for example messages may efficiently be subscribed to in an advantageous manner which indicate error events in specific machines/units. In general, specific events may exist as separate topics such as a filler machine reaching a specific output. In this manner, it is advantageously possible to determine possible wear of a machine relatively quickly, as usually a high output correlates with high load, which usually results in higher wear.

In the described embodiment example, topic 319 stands for "services". In this part of the topic tree 303, the services provided by the communication subscribers are entered.

The automation system 301 comprises a first communication subscriber 329 as well as a second communication subscriber 331. The automation system 301 e.g. comprises further communication subscribers that are not shown for clarity reasons.

Due to the existence of topic 319, the communication subscribers know that in general services may be offered in the automation system 301. By searching the sub-topics generated relative to topic 319, the communication subscribers may obtain the information on how the services may be used. In the following, this is explained in more detail by way of examples.

The first communication subscriber 329 offers an archiving service for communication subscribers of the automation system 301.

The first communication subscriber 329 publishes a message 339 on a specified topic 325 on how the archiving service may be used. Hence, topic 325 may be referred to as "service description" or, respectively, "command description and/or parameter description". The publishing process is symbolically depicted by means of an arrow having reference numeral 335.

The automation system 301 comprises a message broker which in reaction to the publishing of message 339 opens topic 325. This topic is a subtopic of topic 321 which stands for "archive", e.g., refers to the kind of service offered by the first communication subscriber 329. Insofar, topic 321 is itself a subtopic of topic 319 "services".

A subtopic of a topic is located one level below the topic.

The second communications subscriber 331 e.g. publishes a message 337 in the topic 307. This publishing process is symbolically indicated by means of an arrow having reference numeral 333.

The first communication subscriber 329 is connected to a data archive 341 in order to store data there.

The message broker generates a topic 327 in which the assignments for the archiving service are to be published. The information that assignments are to be published in topic 327 is e.g. comprised by message 339.

The second communication subscriber 331 is entered for topic 319. The entering process is symbolically shown in FIG. 4 with an arrow having reference numeral 401.

Figure 5:
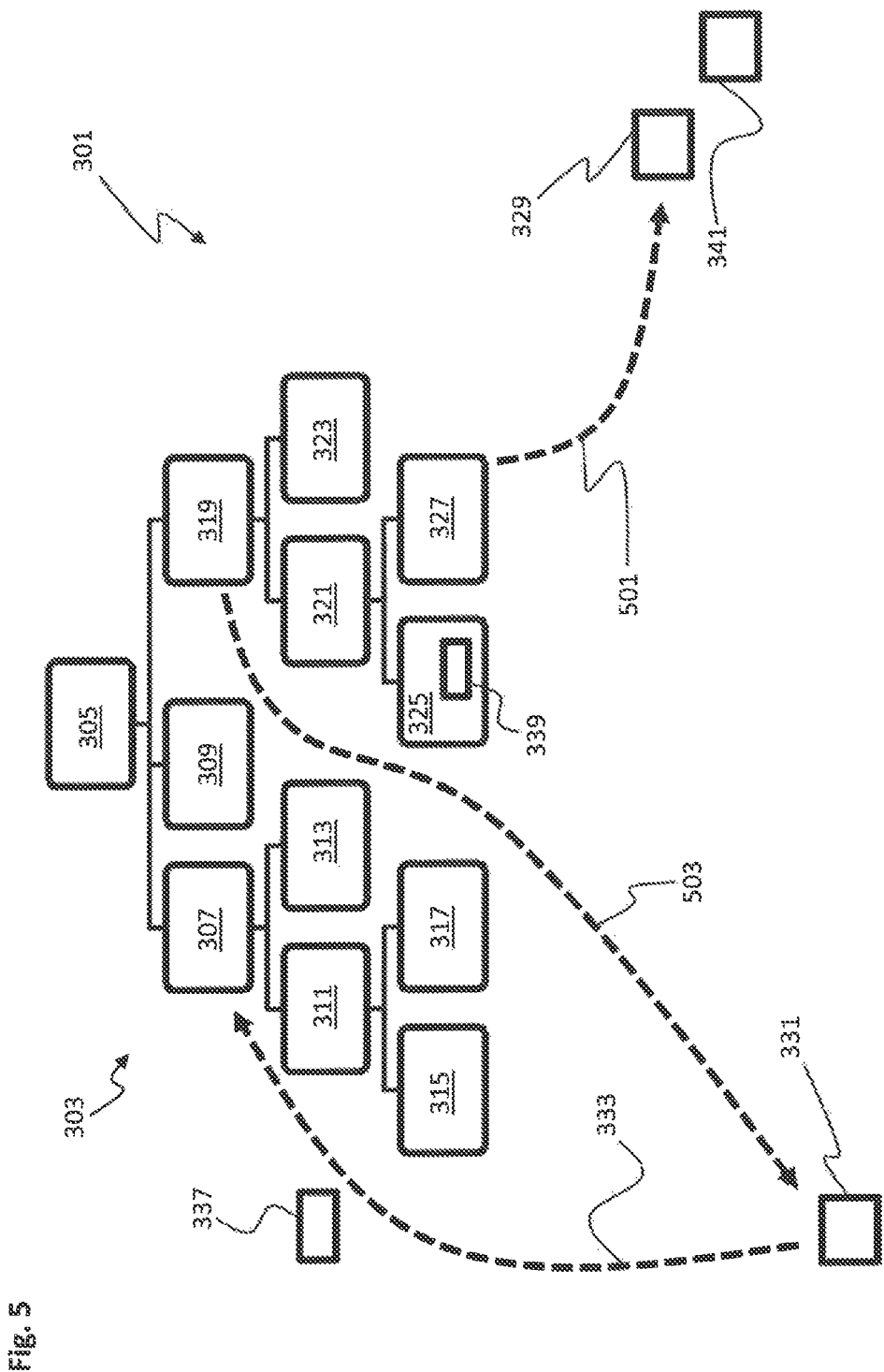

As the second communication subscriber 331 has subscribed to the superordinate topic 319, it automatically receives message 339 entered for topic 325 transmitted by the message broker. In FIG. 5, this is symbolically shown by an arrow having reference numeral 503.

The first communication subscriber 329 continues to subscribe to the topic "assignments" 327. Said subscription process is symbolically shown by means of an arrow having reference numeral 501 (cf. FIG. 5).

Assignments published by communication subscribers in topic 327 are thus automatically transmitted to the first communication subscriber 329 by the message broker.

Figure 6:
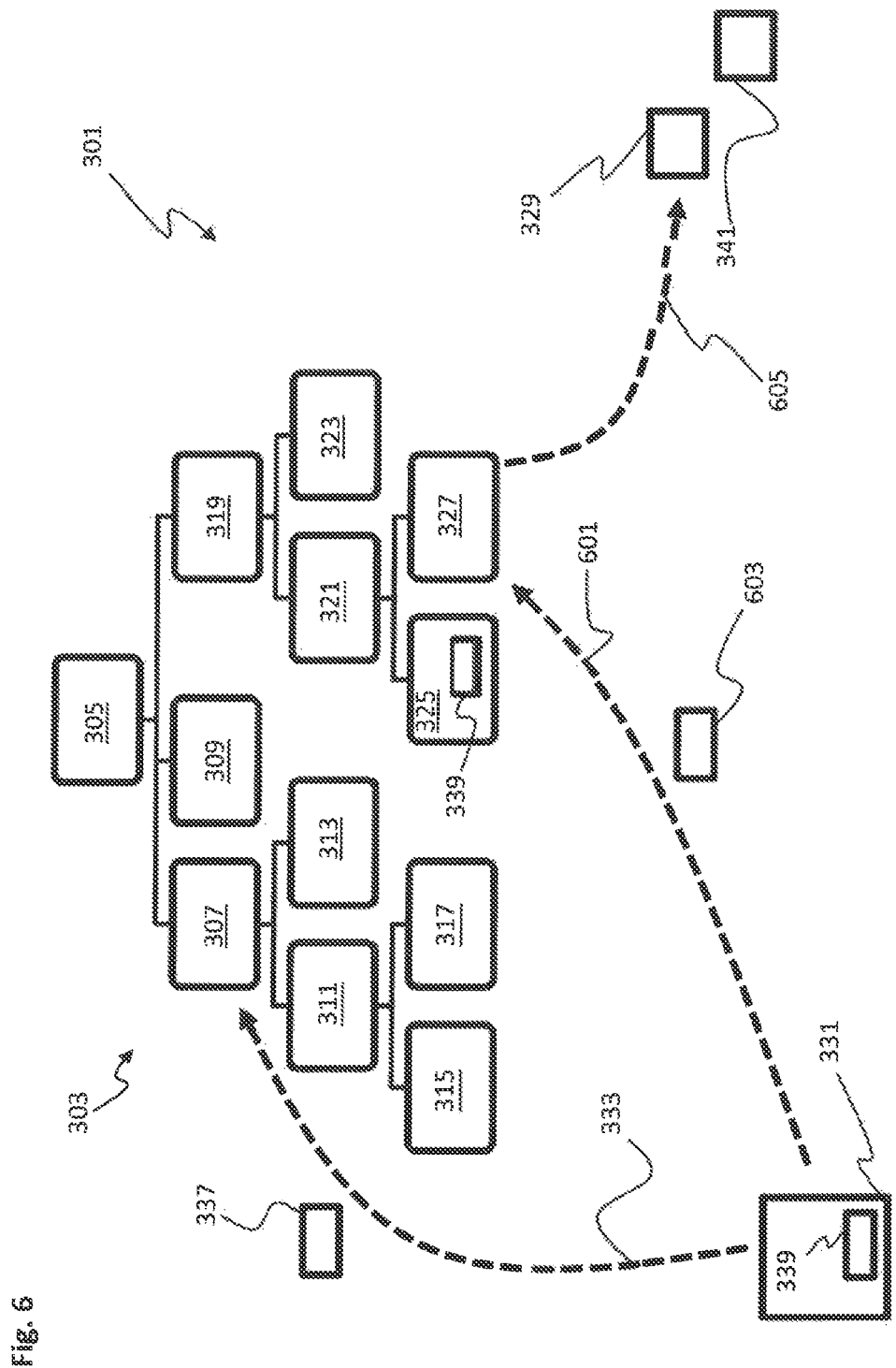
Figure 7:
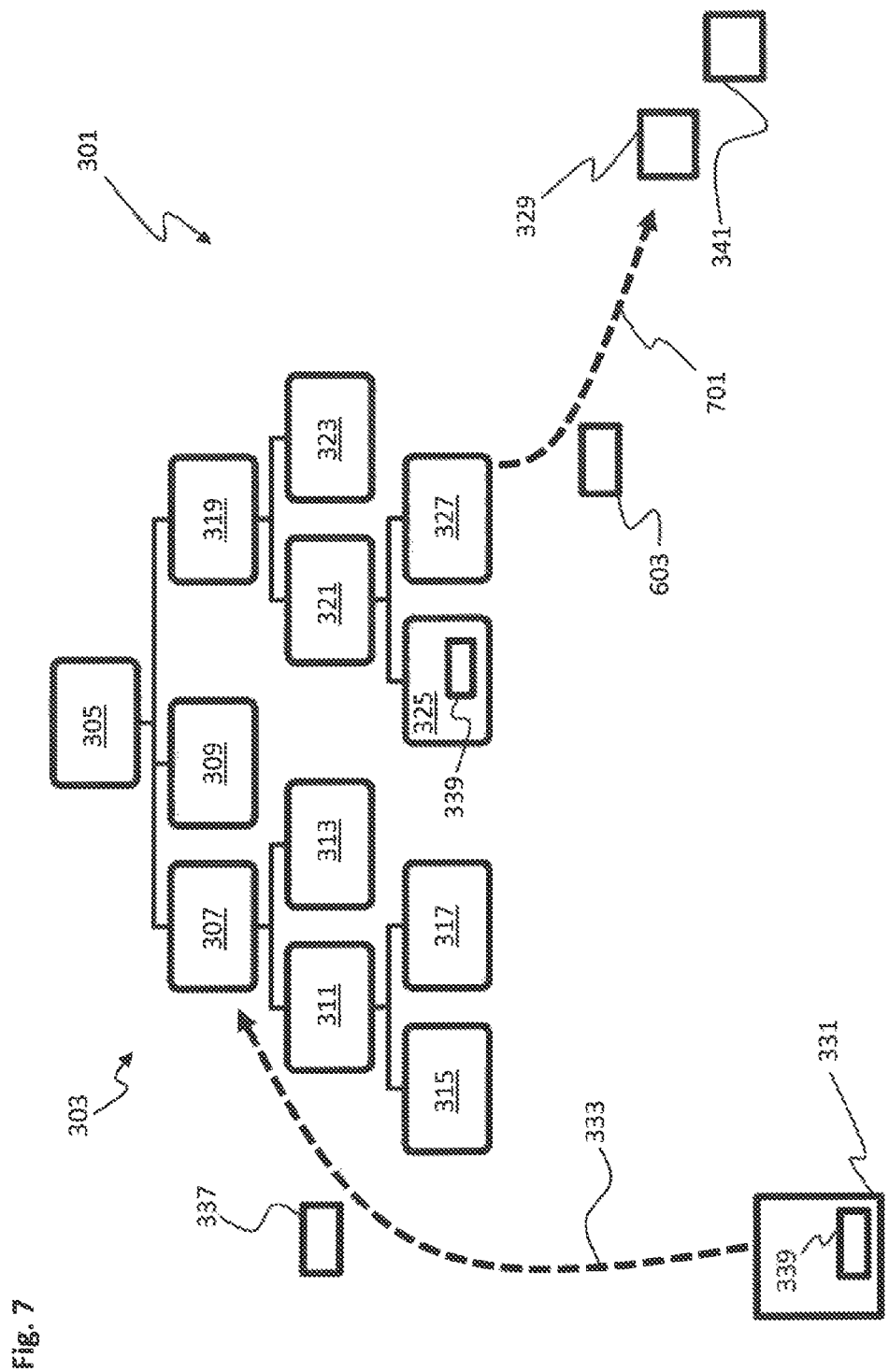

FIG. 6 shows by way of an example how the second communication subscriber 331 publishes an assignment 603 in the topic 327. The assignment e.g. indicates that data from the topic 307 are to be archived for a specific duration of time, e.g. one hour.

In topic 307, e.g. measuring data of a sensor unit are published.

This assignment is received by the first communication subscriber 329 as it has subscribed to topic 327. This is symbolically depicted in FIG. 7 by an arrow having reference numeral 701.

Figure 8:
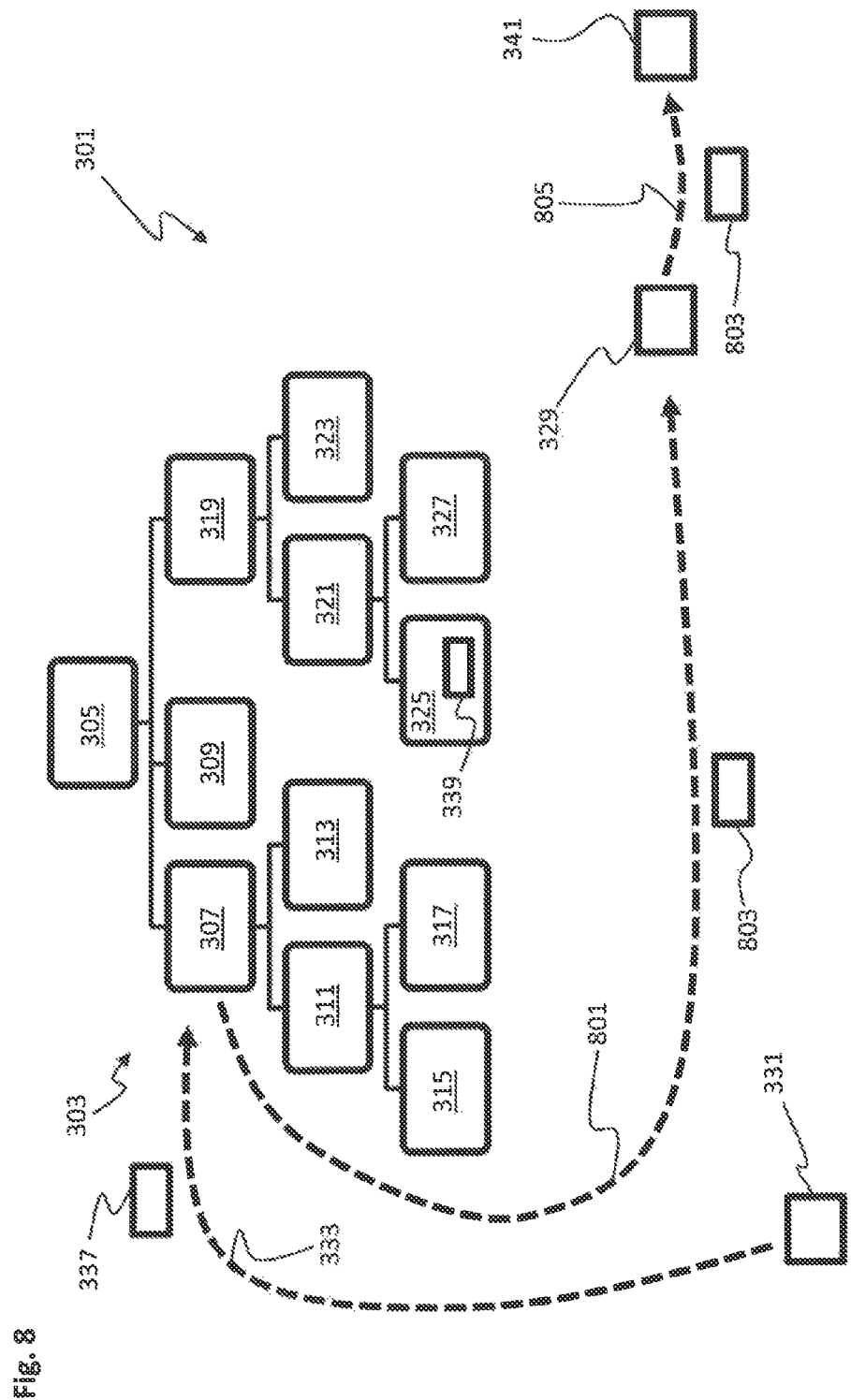
Figure 9:
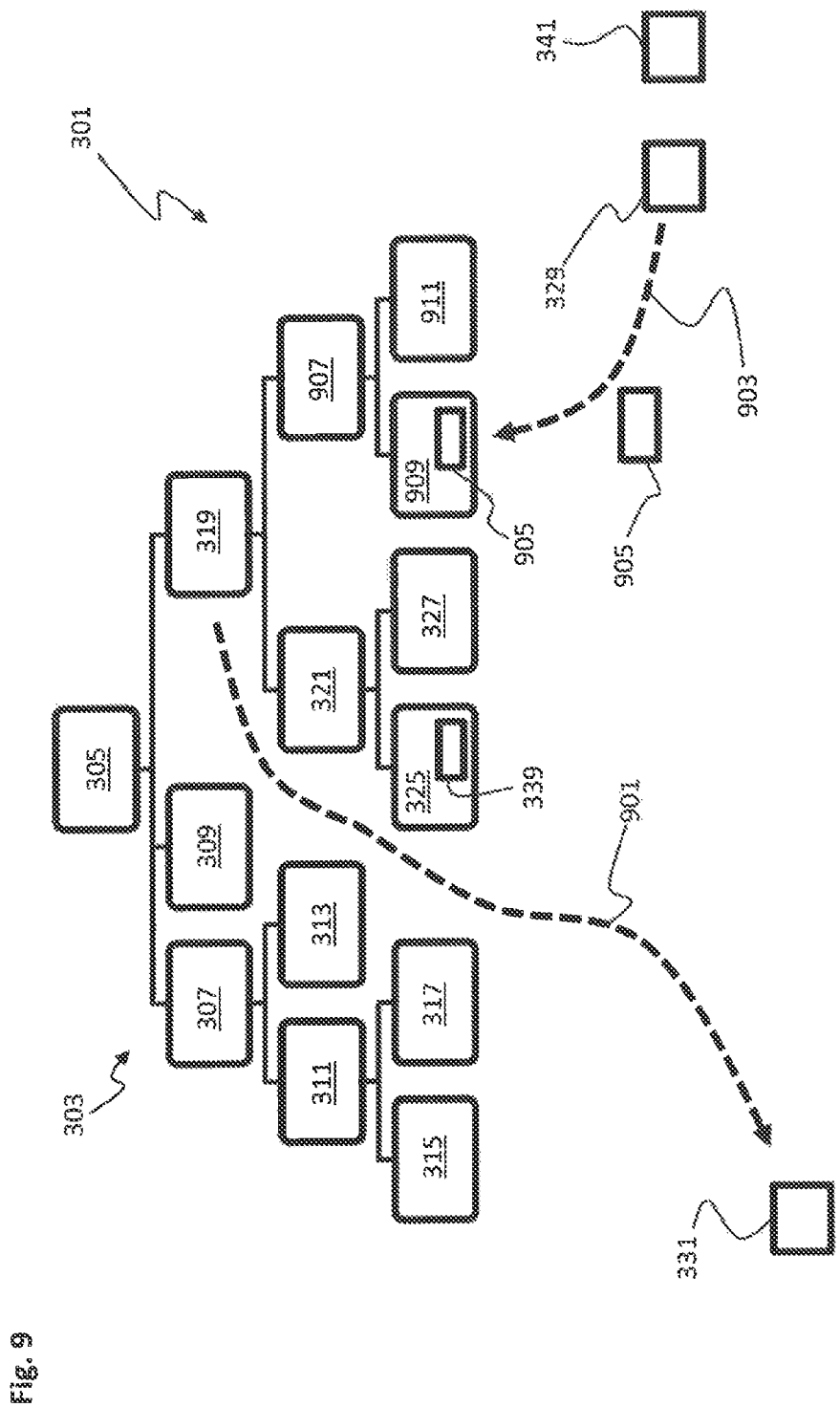
FIGS. 9 to 13 respectively show a block diagram illustrating various steps in a further method for controlling a message transmission between communication subscribers of an automation system.

FIG. 8 shows by way of an example how the first communication subscriber 329 subscribes to topic 307 according to assignment 603 in order to obtain the corresponding data from topic 307. Accordingly, the message broker then transmits the corresponding topic 307 data to the first communication subscriber 329. These data from topic 307 have reference numeral 803 in FIG. 8.

The first communication subscriber 329 archives said data 803 in data archive 321 which is symbolically depicted with an arrow having reference numeral 805.

Archiving is e.g. stopped after a specific amount of time, provided this is indicated in the assignment.

FIGS. 9 to 13 each show a block diagram of the automation system 301 which respectively shows steps in a further method for controlling a message transmission between communication subscribers of an automation system.

The first communication subscriber 329 offers a further service that is able to provide data archived in the data archive to other communication subscribers. The further service may e.g. be referred to as a data-provision service.

The first communication subscriber 329 publishes a message 905 on a specified topic 909 on how to use the data-provision service. Topic 909 may hence be referred to as "service description" or, respectively "command description and/or parameter description". This publishing process is symbolically shown by means of an arrow having reference numeral 903.

In reaction to message 905 being published, the message broker opens topic 909. This topic is a subtopic of a topic 907 which stands for "data provision" and hence refers to the kind of service offered by the first communication subscriber. Insofar, topic 907 itself is a sub-topic of topic 319 "services".

The message broker generates a topic 911 in which the assignments for the data-provision service are to be published. The information that assignments are to be published in topic 911 is e.g. comprised by message 905.

The second communication subscriber 331 continues to subscribe to topic 319 "services", which is symbolically indicated by an arrow having reference numeral 901.

As the second communication subscriber 331 subscribes to topic 319, it automatically receives message 905 from the message broker.

In addition to topic 327, the first communication subscriber 329 subscribes to topic 911 in which the corresponding assignments are published in order to obtain these automatically.

Figure 10:
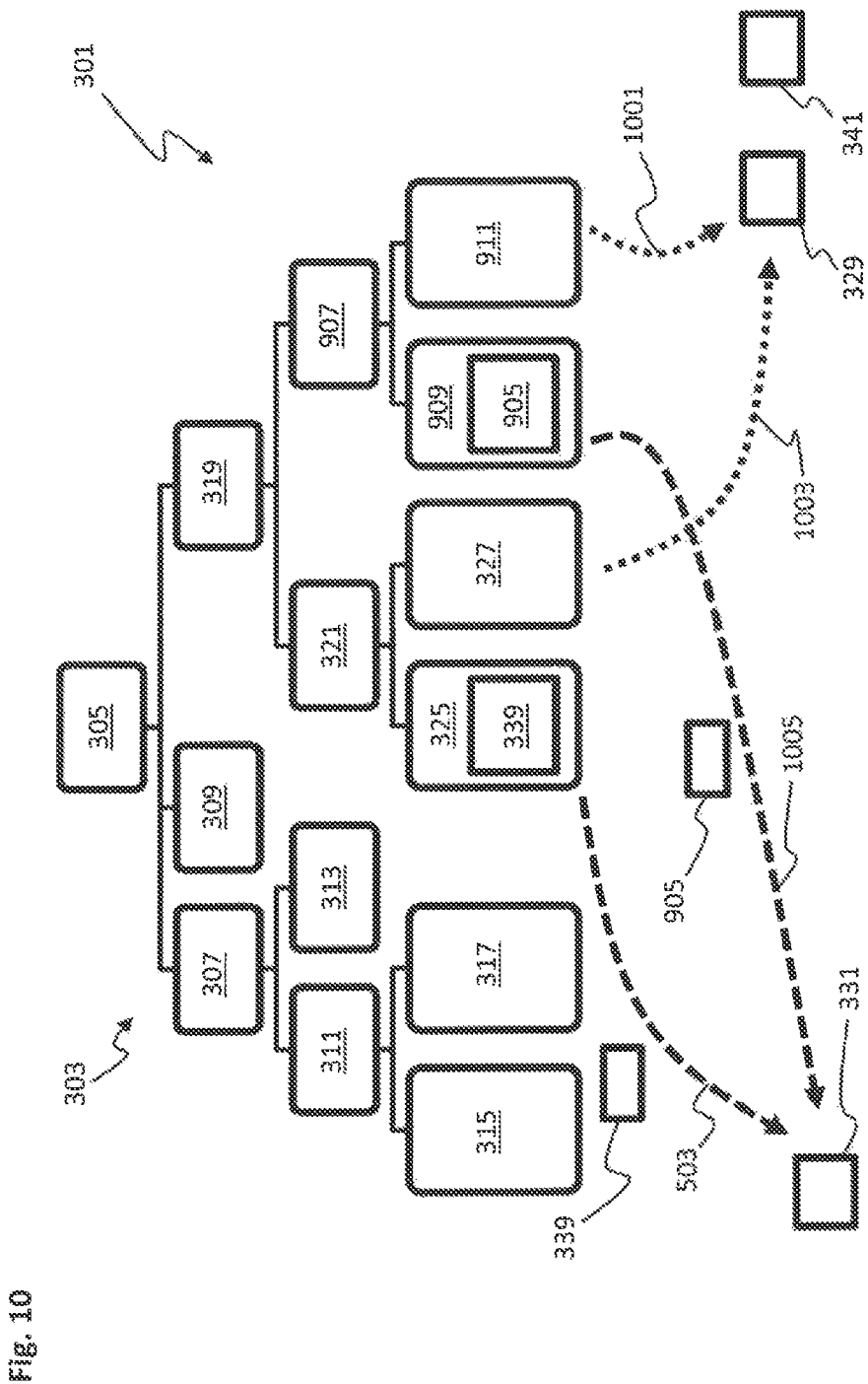

The subscribing process is symbolically shown in FIG. 10 by means of arrows having reference numerals 1001 and 1003.

Transmitting the messages 339 and 905, respectively, to the second communication subscriber 331 is symbolically depicted in FIG. 10 by arrows having reference numerals 503 and 1005, respectively.

The second communication subscriber 331 e.g. publishes an assignment in topic 911. The assignment 1103 e.g. indicates that all data archived in data archive 341 with regard to topic 315 that have a data within a specific period of time, are to be published in a topic 1203, wherein the topic 1203 is generated by the message broker (cf. FIGS. 11 and 12).

Figure 11:
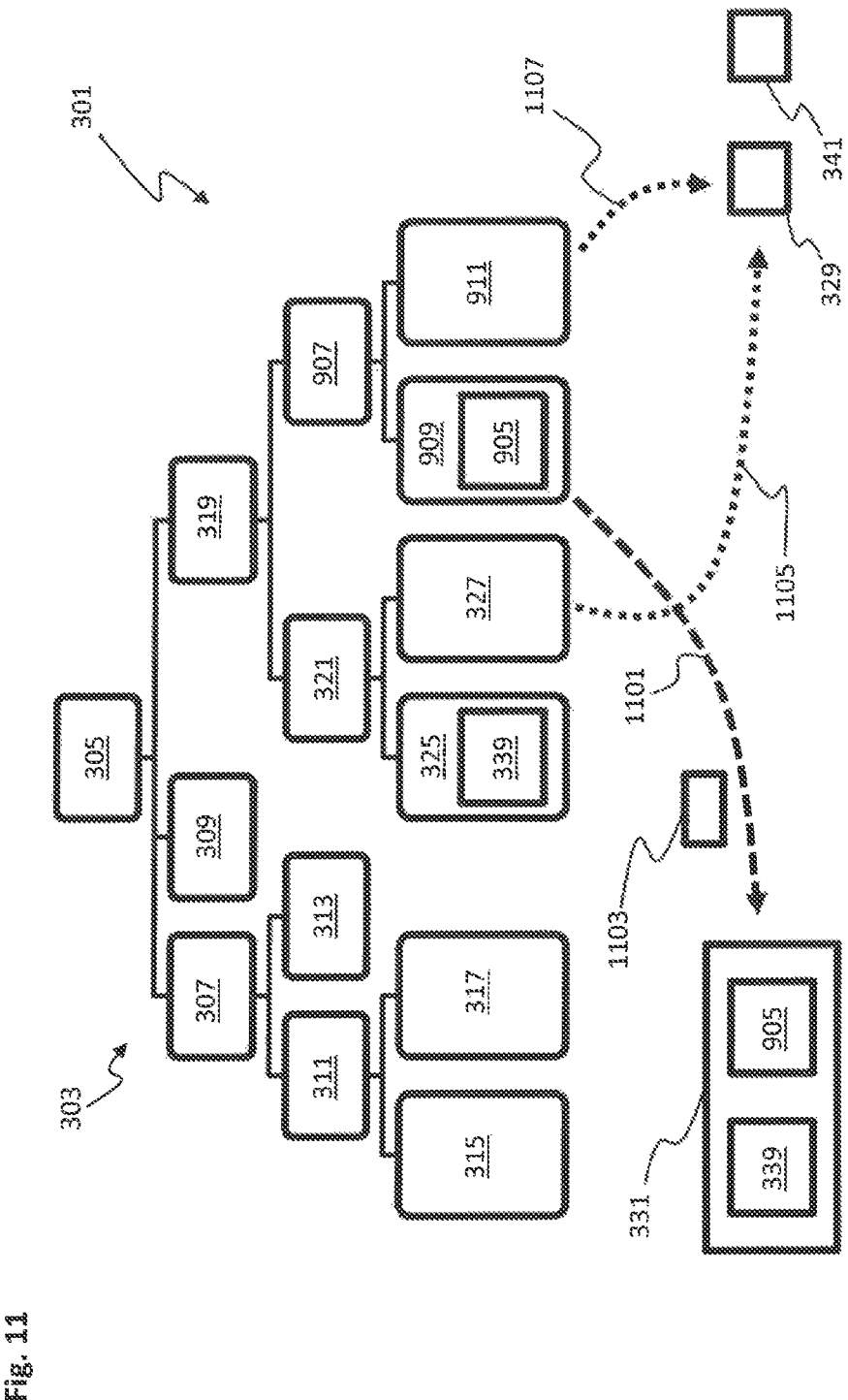

The publishing of the assignment 1103 is symbolically shown in FIG. 11 by means of an arrow having reference numeral 1101.

Due to the corresponding subscription, the first communication subscriber 329 automatically receives assignments published in the topics 327 and 911. This transmission process by the message broker to the first communication subscriber 329 is symbolically shown in FIG. 11 by means of an arrow having reference numerals 1105 and 1107.

Figure 12:
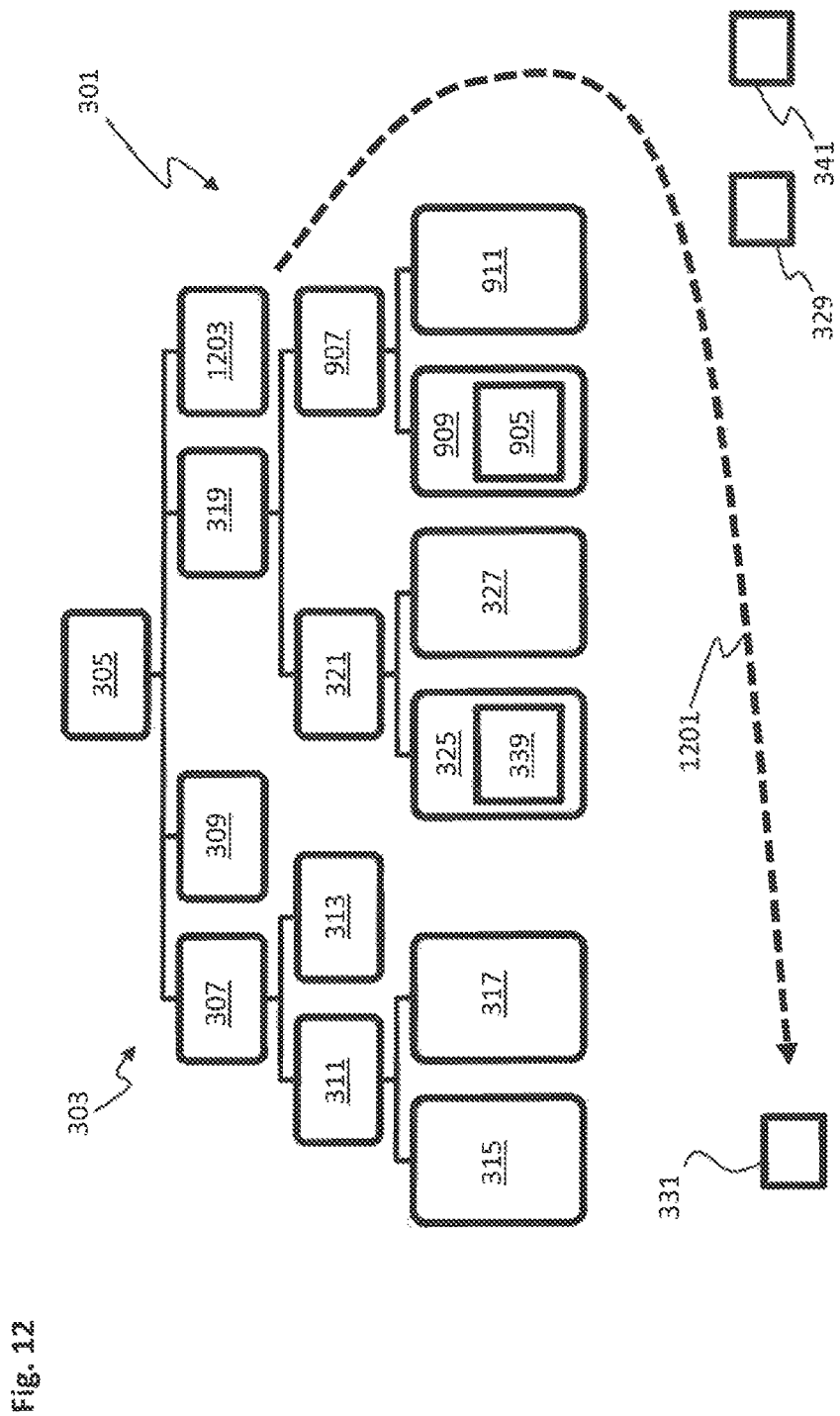

FIG. 12 shows that the second communication subscriber 331 has subscribed to topic 1203 in order to receive data that the first communication subscriber has published there.

The subscription is symbolically shown in FIG. 12 by means of an arrow having reference numeral 1201.

In line with the assignment, the first communication subscriber 329 reads the corresponding data 1301 out of the data archive 341 and publishes them in topic 1203, from which the data 1301 are transmitted to the second communication subscriber by the message broker.

Figure 13:
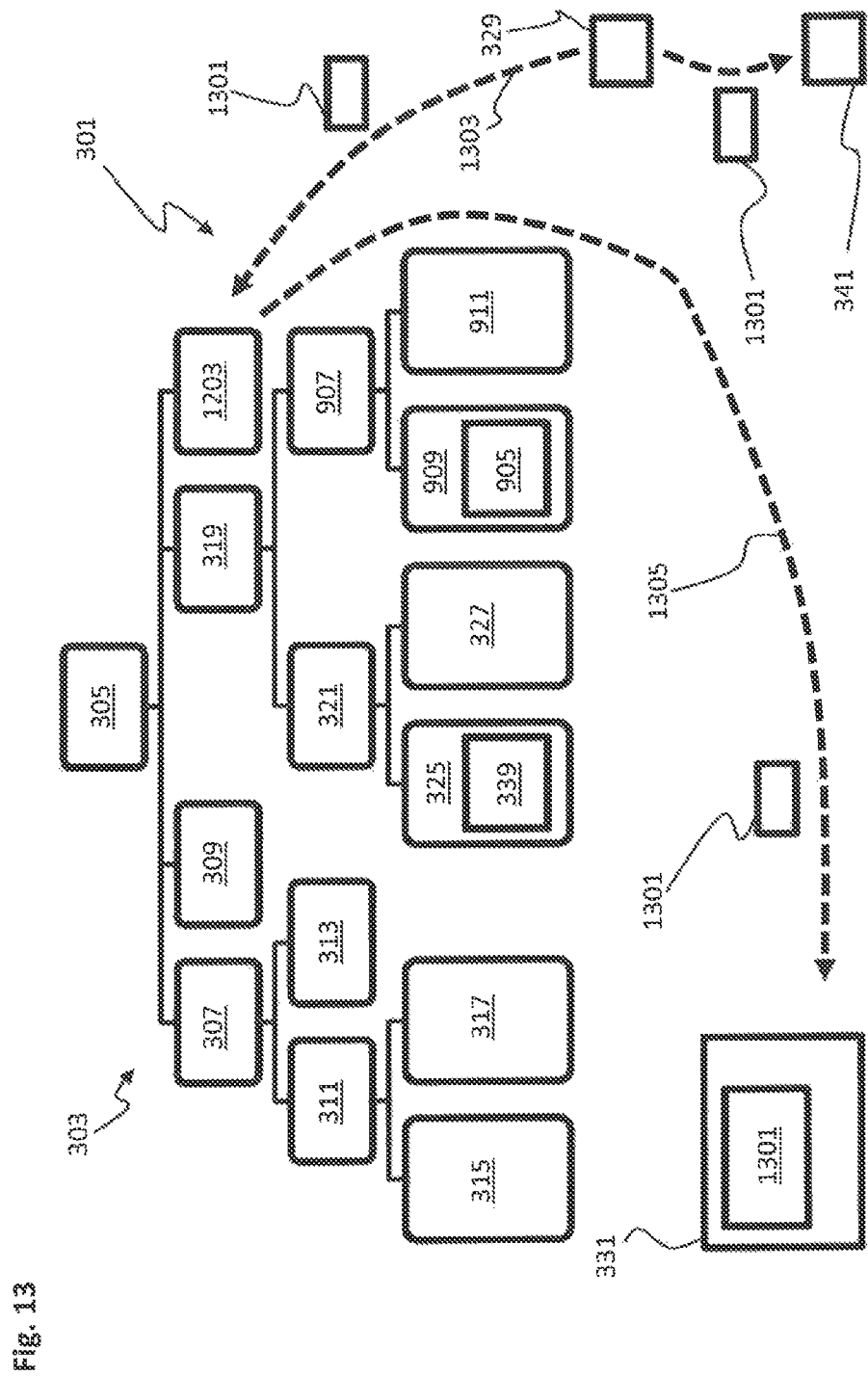

Publishing of data 1301 in topic 1203 is symbolically shown in FIG. 13 by means of an arrow having reference numeral 1303.

Transmitting the data from topic 1203 to the second communication subscriber 331 is symbolically shown in FIG. 13 by means of an arrow having reference numeral 1305.

For the individual steps of publishing or, respectively, entering, one or a plurality of publisher applications and/or one or a plurality of subscriber applications are carried out on the corresponding communication subscribers.

In the following, the inventive concept will be further explained with regard to a mail station which may be accessed by several communication subscribers of an automation system.

In the following substantiations, IoT clients are communication subscribers. A service-offering IoT client is a first communication subscriber according to the present description. A service-using IoT client is a second communication subscriber according to the present description.

A storage provider corresponds to an archiving service.

For the communication of various IoT clients via a message broker, the topic structure (tree structure or topic tree) is defined in such a way that it may be used as a central communications-administrating structure for automation technology. IoT clients thus may not only send and receive data, but also offer any desired services such as long-term archiving of data for other IoT clients which e.g. analyze data (which may e.g. be a service).

A topic "service" e.g. comprises a topic "command description" and a topic "result" as subtopics. In the topic "command description", information on which commands (and additionally e.g. which parameters) the service expects is published. In the topic "result" the results, e.g., the output of the service are published. The topic "command description" may e.g. be referred to as a "command" topic. The topic "result" may e.g. be referred to as a "result" topic.

A service-offering IoT client publishes the potential services and their description to a topic e.g. defined by keywords by a message broker. At the same time, the service-offering IoT client knows the topic in which a service-using IoT client would publish a command for carrying out a service (again due to the keywords). The service-offering IoT client automatically subscribes to this command topic. For example, the command topic may also be a subtopic of the service topic, however, not necessarily. In a command topic, e.g. result topics may be specified in which the results of the executed services may be stored. Generally, relevant topics are identified by any desired message broker via keywords or a shuffling of keywords within the topic architecture.

The keywords are communicated to the IoT clients e.g. beforehand. The IoT clients are particularly capable of subscribing to all topics of a message broker; hence, they are able to search for keywords and topic structures in an advantageous manner.

The service-using IoT client e.g. automatically subscribes to topics for which services are on offer. As a result, the service-using IoT client knows which services are on offer, how the services are structured and which commands and parameters they expect. Moreover, the service-using IoT client knows to which topic it has to publish its command for executing the service (as already described, the service-offering IoT client has automatically subscribed to this topic).

By determining these communication structures, the IoT clients may exchange data, services and also commands via a central message broker. This is a particular advantage as no rules are at first defined for direct communication between IoT clients in a publisher/subscriber communication.

As in automation technology, data are typically exchanged in fast cycles, it makes sense for IoT communication—even if it is not necessary—to exchange data in a binary format. The above-described architecture of the topics and the thus-enabled access to services of various IoT clients is also applicable when utilizing other data formats.

If, however, a binary string is chosen for top-performance demands, e.g. the use of retain topics of a message broker of an automation system is provided as in this case a data description of the binary string has to be made accessible.

A retain topic is a topic in which messages are retained even if no subscriber application has currently subscribed for the topic.

Only in this way is it possible for each IoT client to flawlessly interpret data. The data description is published by the data generator in a retain topic. The message broker is informed by a corresponding clue in the message that this is a retain topic. Contrary to data of other normal topics, data of the retain topic are retained further by the message broker even if no other client is currently interested in the data, e.g., has subscribed to them. In this way, an IoT client (data recipient) connecting to normal topics may always subscribe to a currently valid data description for the binary string. Retain topics may also be subtopics of normal topics, which means that the description of data may also be located below an actual data topic—however, it may also be detached therefrom.

If the data description is located in a retain topic, the time and effort involved in communication may advantageously be reduced. The data generator has to send the description only once and the data recipient has to look at it only once in order to be able to continuously interpret the data. The data description, however, is only valid as long as a corresponding change of the data description occurs on the data generator (e.g. a control unit or a control device).

In an automation system, these may, in the case of control units, e.g. be new code downloads or other so-called online changes. Online changes are e.g. changes in the control program which are carried out during operation of the control unit. By these actions, a new data description is generated which the data-generating IoT client directly publishes to the retain topic. There, the data description is updated and each IoT client subscribed to the data description is informed accordingly. This guarantees correct data interpretation even if the data description is changed.

In the following, the inventive concept will be exemplarily explained with regard to a data-archive provider. The data-archive provider will in the following be referred to as "storage provider".

A machine control is configured as an IoT client. Upon activating the automation system, communication with an IoT message broker in a network is commenced. The machine control cyclically publishes data in a binary format to a normal topic at the message broker. This topic may e.g. look as such: "manufacturer/client5/machine18/transport-system/data". For this, the machine control first publishes a valid one-off data description to a retain topic. This description is necessary in order to allow other IoT clients to interpret the binary data.

The storage provider is an IoT client acting as a gateway to various storages (data archives). It connects to the message broker, as well, and there offers services which it indicates in a predetermined service topic, such as: "CSP_manufacturer/client5/storage/services". In further subtopics, it may store a description of the services or receive the commands of other IoT clients. As a result, other IoT clients do not have to know beforehand which services are on offer, but may read them out without previous knowledge. In this example, the storage provider offers the services RecordData (data archiving) and GetHistoricalData (providing archived data).

A third IoT client is a personal computer for analysis. This analysis PC connects to the message broker, as well. On the basis of predetermined keywords, it may, amongst other things, find the data and description topics of the storage provider and the data and description topics of the machine control. The analysis PC hence recognizes that the storage provider offers a RecordData service, amongst others. In this way, the analysis PC may now read out the service description and which commands and parameters the service expects. For RecordData, it e.g. expects two parameters: StartRecord in order to start recording and the topic of the data to be recorded.

In a "description" topic, e.g. the commands (e.g., the command description) and/or the parameters (e.g., the parameter description) is/are published that the service expects for its use. The "description" topic may thus be referred to as a combined "command"/"parameter" topic.

This means that the analysis PC sends a StartRecord (command for "start archiving") and the topic (manufacturer/client5/machine18/transport-system/data" of the machine control unit to the topic "CSP_manufacturer/client5/storage/services/RecordData/command". Due to its service description, the storage provider expects the command at precisely this topic and has automatically subscribed to it. The data description may automatically be identified by the storage provider in a subtopic of the data topic due to the keywords.

Alternatively or additionally, this may be a third parameter in the received command. The storage provider now subscribes to the data published by the machine control to the message broker and stores them e.g. continuously in the downstream storage where it also one-off-stores the data description until a StopRecord command is received.

If the analysis PC wants to evaluate historical data, it may send a command to the service "GetHistoricalData" (command for "get archived data") or, respectively, to the corresponding command topic of the storage provider. Here, as well, e.g. potential parameters may exist individually which may be handed over. For a GetHistoricalData service, these may be:
- data (e.g. selection of previously recorded variables),
- period of time (e.g. 12 a.m. on 05/01/2016 until 12 a.m. on 07/01/2016),
- result topic in which the storage provider is to publish the data from the storage.

The analysis PC publishes the command and without delay subscribes to the result topic it has itself mentioned in the command in order to receive the data from the storage provider there. In the storage provider, the same mechanism takes place as in the RecordData service, however, this time it retrieves data from the storage in order to publish them in the result topic instead of writing data into the storage.

If the data description on the machine control now changes without any information exchange, all other IoT clients that have operated with the data of the machine control can no longer flawlessly or at all interpret it, starting from the point in time of the change. For this reason, it is provided to update the data description on the retain topic in case of changes. If for example an online change of the control program which is typical for an automation system is carried out, the data description changes. The machine control then publishes the updated description to the retain topic which is still retained by the message broker, and the other IoT clients still subscribe to the topic. The data description is overwritten in the retain topic and all subscribed IoT clients receive a copy of the new description. The storage provider would e.g. recognize this and store a new data description in its storage starting at the corresponding point in time. In this way, the data may always be interpreted correctly and even after a change in the data description, historical data may flawlessly be communicated to the analysis PC via the central message broker.

The inventive concept is further exemplarily described in more detail with regard to a mail station, wherein the topics or messages, respectively, described in connection with the mail station represent place holders for topics or messages, respectively, as they are used in connection with automation systems and their elements, such as: machine, error message, data archiving (cf. above).

It is for example provided that users (IoT clients) of a mail station exist that wish to offer a service to other users. For example, a mail-archiving service Archive is provided. Thus, the user offers to archive all mail for a certain topic upon demand. As the users do not know each other and a direct user-to-user communication is not possible, the service creates a letter in which it describes its service and publishes this letter to an explicit service mail box (topic "Service"). In this service mail box, the other users may gather information on the services on offer by subscribing to the mail box and thus receive updated service-description letters. Of course, they know that this service mail box exists, in which topic or in which defined topic structure they will find it and how they may deal with it.

The letter in which the service provider describes its archiving service e.g. comprises all information relevant for a potential user, so that the user may use the service without previous knowledge. An integral part is information on name and location of the mail box (e.g., the topic) in which the assignment may be placed, and on the parameters required in order to carry out the assignment (e.g. starting time, archiving duration, topic to be archived). If a user wants to use the archiving service to e.g. have all letters for the topic Animals archived, they will create an assignment letter comprising the required information in the indicated assignment-placement mail box. For practical reasons, this mail box is a "sub-mail box" (subtopic) of the archiving-service mail box and thus has an address such as mailstation/services/archive/assignments.

The service provider has subscribed to this Assignments mail box so as to keep informed on assignment placements. At the indicated point in time, it will start to archive the indicated topics. The user does not know where and in which manner the archiving service carries out archiving. In any case, the archiving service now subscribes to all letters for the specified topic and stores and sorts copies thereof in its archive (data base).

It is for example provided that the user wishes to stop the service. This, too, is done via the Assignments mail box. In this case, it of course makes sense that the service provider offers another service by which the user may gain access to the archived data—or to a selected part thereof. However, such an access still cannot be carried out in a direct manner: neither may the user directly access an archiving database, nor communicate directly with the user—this is only possible via a central node, e.g., the mail station.

Thus, the service provider offers the service GetArchived. It has to gather information from the user which letters from which time period are to be requested and in which mail box the data are to be stored. For example, the user states in its assignment letter that they wish to receive all letters of 11/07/2016, 0:00 a.m. to 12/07/2019, 9:00 a.m. on the topic mail_station/nature/animals/butterflies. It is to be noted that previously all letters for the topic mail_station/nature/animals/butterflies were archived and thus the archiver is required to construct their archive in such a way that they are able to retrieve individual sub-topics and output them.

As a target mail box the user names the mail box mail_station/my_old_letters and at the same time subscribes to it. The GetArchived service receives the assignment letter and starts right away to find the appropriate archived letters and store copies of it in the mail box my_old_letters.

It is now e.g. provided that the GetArchived service stores the letters in the mail box my_old_letters individually, in the correct order and, if the case may be, with high speed. A much faster embodiment is that the GetArchived service sends a number of letters to the mail box in a bundled package, which allows for increasing the speed by a multiple.

Another user may retrieve the archived letters from the archiving service, as well.

In a further embodiment, it is provided that a service provider does not offer its service in a service-mail box, but 'attaches' it directly to the mail boxes for which it can offer its service. In the case of the archiving service, a user thus regularly stores letters relating to a topic in the corresponding mail box and searches for a service in the corresponding mail box. This service it may then use in the above-described manner, which would require less parameters to be indicated. Which of the two described embodiments is more suitable particularly depends upon the kind of service.

In summary, the concept efficiently provides and efficiently uses services by IoT clients in automation technology, e.g., for an automation system, based on a publisher/subscriber communication.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A method for controlling a message transmission between communication subscribers in an automation system wherein one or a plurality of publisher applications and/or one or a plurality of subscriber applications are executed on each of the communication subscribers, wherein the subscriber applications are configured to receive information in the form of messages from the publisher applications, wherein the automation system comprises a message broker decoupling message transfer between the communication subscribers and handling all the messages, the message broker being configured to enter subscriptions for specified topics for designated subscriber applications into a topic tree, said method comprising the following steps:

in reaction to a message received by the message broker on a specified topic of the topic tree being published by a publisher application of a first of the plurality of communication subscribers, the message informing that one or a plurality of services are offered by the first communication subscriber, determining by the message broker whether a subscriber application of a second of the plurality of communication subscribers has been entered for the specified topic or not; and, if a subscriber application for the specified topic has been entered, transmitting, by the message broker, a message to the entered subscriber application of the second communication subscriber, the message informing that the one or the plurality of services are on offer.

2. The method of claim 1, wherein the message of the publisher application of the first communication subscriber comprises the information in which topic of the topic tree assignments for the one or for the plurality of services are to be published, further comprising the following steps:

entering, by the message broker, a subscription for the topic in the topic of the topic tree of which assignments for the one or for the plurality of services are to be published, said subscription generated by a subscriber application of the first communication subscriber; and in reaction to a message on the topic of the topic tree, in which assignments for the one or for the plurality of services are to be published, having been published by a publisher application of the second communication subscriber, that an assignment corresponding to the one or to the plurality of services is to be executed, transmitting the published message by the message broker, that an assignment corresponding to the one or to the plurality of services is to be executed, to the entered subscriber application of the first communication subscriber.

3. The method of claim 2, wherein the assignment indicates that messages from a specified topic of the topic tree are to be processed by the service or services, further comprising the following steps:

in reaction to that by a subscriber application of the first communication subscriber a subscription was generated for the specific topic;

entering the subscriber application of the first communication subscriber for the specific topic by the message broker; and transmitting the messages on the specific topic to the subscriber application of the first communication subscriber by the message broker.

4. The method of claim 1, wherein the assignment indicates that data for a specified topic of the topic tree processed by the first communication subscriber are to be published, comprising the following step:

in reaction to that a message comprising the processed data on the specified topic was published by a publisher application of the first communication subscriber, transmitting the message comprising the processed data to a subscriber application of the second communication subscriber entered for the specified topic by the message broker.

5. The method of claim 1, wherein the message that the first communication subscriber offers one or a plurality of services comprises a command specification that indicates which commands the service or services expect, and/or which comprises a parameter description that indicates which parameters the service or the services expect, comprising the following step:

transmitting the command specification and/or the parameter description to the entered subscriber application of the second communication subscriber by the message broker.

6. The method of claim 1, comprising the following step:

in reaction to a message of a publisher application of one of the communication subscribers on a topic being published wherein the message comprises a data specification on how the data of one of the communication subscribers have to be interpreted, saving the data specification by the message broker.

7. The method of claim 6, wherein the specified topic of the topic tree corresponds to the topic corresponding to the message of the one of the communication subscribers, comprising the following step:
   transmitting the data specification to the subscriber application of the first communication subscriber by the message broker.

8. The method of claim 1, wherein the messages are in a binary format.

9. The method of claim 1, wherein the service or the services are selected from the following group of services: archiving, data analysis, status monitoring.

10. A message broker for an automation system comprising a plurality of communication subscribers, wherein one or a plurality of publisher applications and/or one of a plurality of subscriber applications are executed on each of the communication subscribers, wherein the subscriber applications are configured to receive information in the form of messages from the publisher applications, wherein the message broker decouples message transfer between the communication subscribers and handles all the messages, wherein the message broker is configured to enter subscriptions for specified topics for designated subscriber applications into a topic tree, wherein, in reaction to a message on a specified topic of the topic tree being published by a publisher application of a first communication subscriber of the plurality of communication subscribers, the message indicating that the first communication subscriber offers one or a plurality of services, the message broker determines whether a subscriber application of a second communication subscriber of the plurality of communication subscribers has been entered for the specified topic or not and, if a subscriber application for the specified topic has been entered, transmits a message to the entered subscriber application of the second communication subscriber, the message informing that the one or the plurality of services are on offer.

11. The message broker of claim 10, wherein the message of the publisher application of the first communication subscriber comprises the information in which topic of the topic tree assignments for the one or for the plurality of services are to be published, the message broker being configured to enter a subscription for the topic in the topic of the topic tree of which assignments for the one or for the plurality of services are to be published, said subscription generated by a subscriber application of the first communication subscriber, and the message broker being further configured, in reaction to a message on the topic of the topic tree, in which assignments for the one or for the plurality of services are to be published, having been published by a publisher application of the second communication subscriber, that an assignment corresponding to the one or to the plurality of services is to be executed, to transmit the published message by the message broker, that an assignment corresponding to the one or to the plurality of services is to be executed, to the entered subscriber application of the first communication subscriber.

12. The message broker of claim 11, being configured, in reaction to a message of a publisher application of one of the communication subscribers on a topic being published wherein the message comprises a data specification on how the data of one of the communication subscribers have to be interpreted, to save the data specification.

13. The message broker of claim 12, wherein the specified topic of the topic tree corresponds to the topic corresponding to the message of the one of the communication subscribers, the message broker being configured to transmit the data specification to the subscriber application of the first communication subscriber.

14. The message broker of claim 10, wherein the assignment indicates that messages from a specified topic of the topic tree are to be processed by the service or services, the message broker being configured, in reaction to that by a subscriber application of the first communication subscriber a subscription was generated for the specific topic, to enter the subscriber application of the first communication subscriber for the specific topic and to transmit the messages on the specific topic to the subscriber application of the first communication subscriber.

15. The message broker of claim 10, wherein the assignment indicates that data for a specified topic of the topic tree processed by the first communication subscriber are to be published, the message broker being configured, in reaction to that a message comprising the processed data on the specified topic was published by a publisher application of the first communication subscriber, to transmit the message comprising the processed data to a subscriber application of the second communication subscriber entered for the specified topic.

16. The message broker of claim 10, wherein the message that the first communication subscriber offers one or a plurality of services comprises a command specification that indicates which commands the service or services expect, and/or which comprises a parameter description that indicates which parameters the service or the services expect, the message broker being configured to transmit the command specification and/or the parameter description to the entered subscriber application of the second communication subscriber.

17. An automation system, comprising a plurality of communication subscribers and a message broker, wherein one or a plurality of publisher applications and/or one or a plurality of subscriber applications are executed on each of the plurality of communication subscribers, wherein the subscriber applications are configured to receive information in the form of messages from publisher applications, wherein the message broker decouples message transfer between the communication subscribers and handles all the messages, wherein the message broker notifies if one of the communication subscribers offers one or a plurality of services, wherein the notification is made only on the fact that one or a plurality of the services are on offer and wherein the plurality of communication subscribers are selected from the following group of communication subscribers: actuator units, sensor units, machine-control units, database servers, data-saving servers.

18. An automation system according to claim 17, wherein as soon as one of the subscriber applications of a communication subscriber is entered for a specified topic, the message broker automatically notifies a communication subscriber if the one or the plurality of services are on offer with respect to the specified topic.

19. An automation system according to claim 17, the message broker being configured to enter subscriptions for specified topics for designated subscriber applications into a topic tree, wherein, in reaction to a message on a specified topic of the topic tree being published by a publisher application of the communication subscriber, the message indicating that a first communication subscriber offers one or a plurality of services, the message broker determines whether a subscriber application of a second communication subscriber of the plurality of communication subscribers has been entered for the specified topic or not and, if a subscriber application for the specified topic has been entered, transmits a message to the entered subscriber application of the second communication subscriber that the one or the plurality of services are on offer.

20. The automation system of claim 19, wherein the message of the publisher application of the first communication subscriber comprises the information in which topic of the topic tree assignments for the one or for the plurality of services are to be published, the message broker being configured to enter a subscription for the topic in the topic of the topic tree of which assignments for the one or for the plurality of services are to be published, said subscription generated by a subscriber application of the first communication subscriber, and the message broker being further configured, in reaction to a message on the topic of the topic tree, in which assignments for the one or for the plurality of services are to be published, having been published by a publisher application of the second communication subscriber, that an assignment corresponding to the one or to the plurality of services is to be executed, to transmit the published message by the message broker, that an assignment corresponding to the one or to the plurality of services is to be executed, to the entered subscriber application of the first communication subscriber.

\* \* \* \* \*